July 19, 1938.  R. G. PHILLIPS  2,124,375
REFRIGERATOR CONTROL
Filed March 8, 1937   3 Sheets-Sheet 2
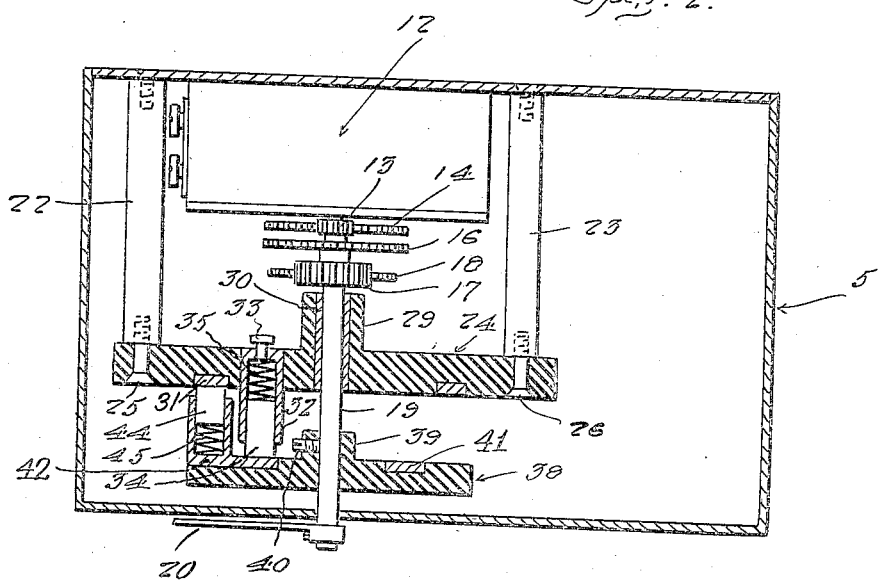
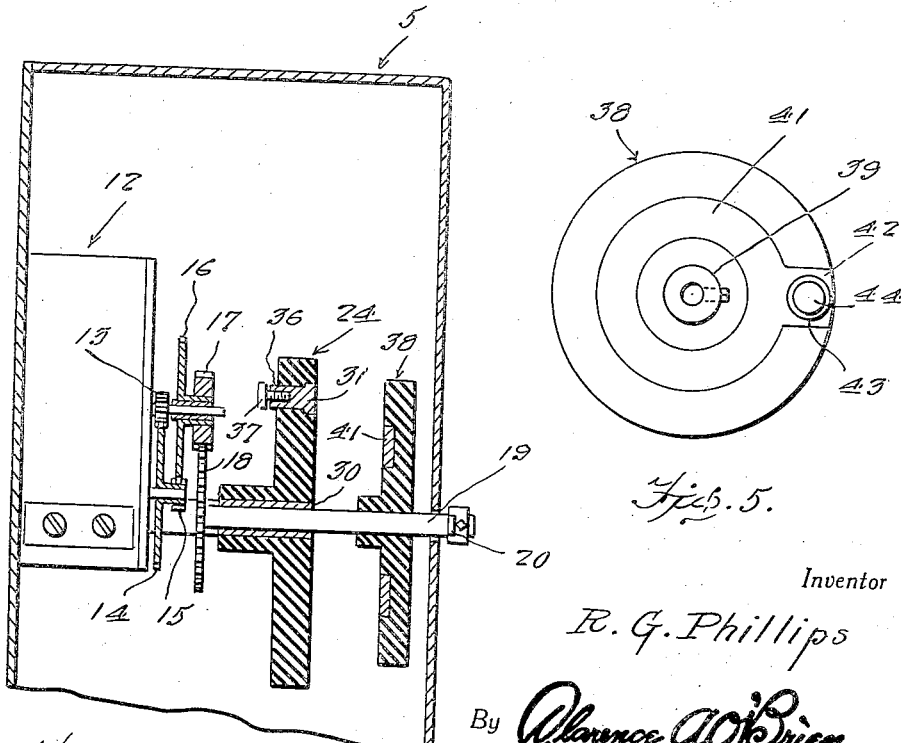
Inventor
R. G. Phillips
By Clarence A. O'Brien
Hyman Berman
Attorneys July 19, 1938.   R. G. PHILLIPS   2,124,375
REFRIGERATOR CONTROL
Filed March 8, 1937   3 Sheets-Sheet 3

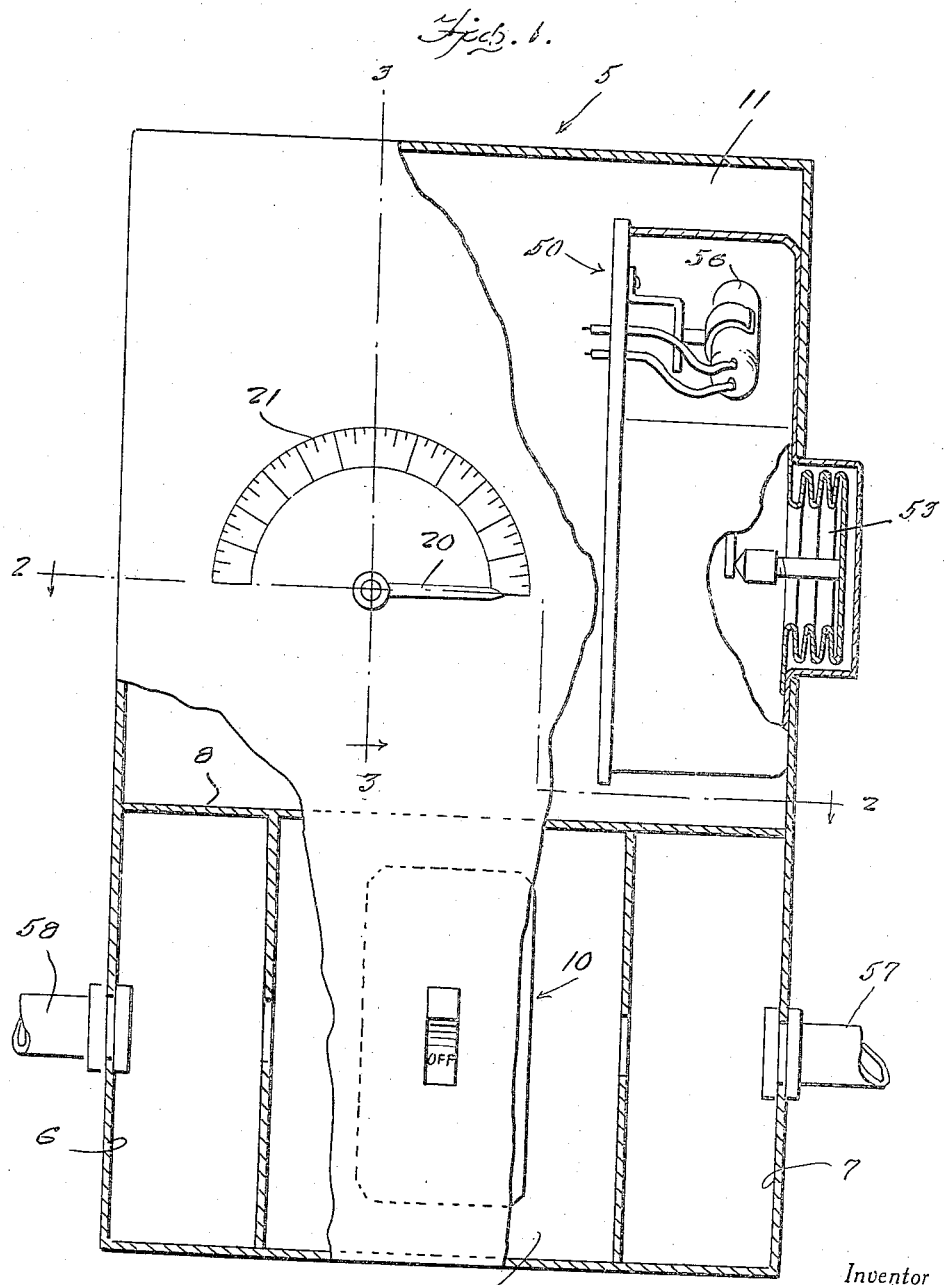

Inventor
R. G. Phillips
By Clarence A. O'Brien
Hyman Berman
Attorneys

Patented July 19, 1938

2,124,375

UNITED STATES PATENT OFFICE 2,124,375

REFRIGERATOR CONTROL

Ray G. Phillips, Port Huron, Mich.

Application March 8, 1937, Serial No. 129,745

6 Claims. (Cl. 62—4)

My invention relates generally to mechanical refrigerators, and particularly to means for controlling the maintenance of the set refrigerating temperature therein and establishing and controlling the period of defrosting thereof, and an important object of my invention is to provide a simple and effective arrangement of this character which can be installed in all conventional refrigerators of the character indicated.

Another important object of my invention is to provide in an arrangement of the character indicated above a time controlled switch device which makes possible the incorporation of the control mechanism with the existing circuits of the refrigerator.

Other important objects of my invention will be apparent from a reading of the following description taken in connection with the drawings, wherein for purposes of illustration I have shown a preferred embodiment of my invention.

In the drawings:—

Figure 1 is a sectional elevational view taken through an embodiment of the invention.

Figure 2 is a horizontal sectional view taken through Figure 1 approximately on the line 2—2 and looking downwardly in the direction of the arrows.

Figure 3 is a transverse vertical sectional view taken through Figure 1 approximately on the line 3—3 and looking toward the right in the direction of the arrows.

Figure 5 is a face view of the rotary contact disk.

Figure 4:
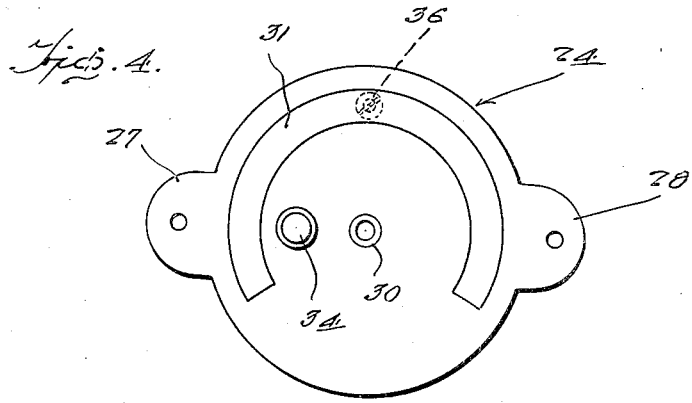
Figure 4 is a face view of the stationary contact disk.

In the operation of mechanical refrigerators, whether domestic or commercial, it is the necessary practice to cut off the current supply to the mechanism to the refrigerator during the defrosting period in order to permit the refrigerating coils to attain a defrosting temperature. While such defrosting is in progress, it frequently happens that the temperature within the refrigerating compartment rises unduly, and the perishable goods therein are then subjected to an injurious temperature; and heretofore no means has been provided to enable automatic and effective prevention of such a deleterious rise in the temperature of the refrigerating compartment during the defrosting period. The present invention comprises an arrangement whereby manual cutting off of the current supply to the refrigerating mechanism is rendered unnecessary, and the refrigerating mechanism is stopped by clock controlled means during the selected defrosting period, and at the end of the defrosting period connected again with the current supply, entirely automatically by clock controlled means which is also effective to establish a circuit with a secondary thermostatic switch in the refrigerating compartment so as upon a rise above a certain established defrosting temperature taking place in the refrigerator, to operatively connect the refrigerating mechanism so that the defrosting temperature is automatically prevented from rising to such a point as to endanger the perishable goods in the refrigerating compartment of the refrigerator. An important and essential element in the arrangement described is a rotary clock controlled switch whose arrangement and functioning makes possible the actions described.

Referring in detail to the drawings, the device of the invention may conveniently comprise a casing 5 of suitable material which has junction boxes 6 and 7 at opposite sides of its lower part and separated from the upper part of the interior of the casing by a horizontal partition 8. Between the junction boxes 6 and 7 is a switch box 9 in which is arranged a manual switch 10 whose office is to enable the regular refrigerating mechanism circuit to be broken or maintained as desired and for purposes to be pointed out herein.

In the upper chamber 11 of the casing 5 is arranged the electrically operated clock 12 which has a pinion 13 in mesh with a gear 14 which includes a pinion 15 which is in turn in mesh with a gear 16 which includes a pinion 17 in mesh with a gear 18, the said gear 18 including a shaft 19 which passes through the front of the casing and has fastened thereto the indicator and setting hand 20 which is used to set the device when installing it and operates in conjunction with a semi-circular scale 21 which is formed with twelve equal divisions each of which is divided into quarters, the main divisions representing hours and the quarter divisions each a quarter of an hour. The shaft 19 is rotated through one complete revolution every twenty-four hours as is the disk 30.

Brackets 22 and 23 projecting horizontally from the back of the casing 5 support a stationary contact disk 24 with the aid of screws 25 and 26 which pass through openings in the disk 24. The disk 24 is preferably of dielectric material or is constructed with dielectric parts in the form of a circle with ears 27 and 28 projecting at opposite diametrical points and through which the screws 25 and 26 pass. From the back of the disk 24 projects a tubular extension 29 which communicates with a bore in the disk, which bore and which extension 29 are lined with a suitable bearing bushing 30 to rotatably support the shaft 19 already mentioned.

Extending concentrically on the face of the disk 24 is a three-quarter circular contact strip 31 which is embedded in the face of the disk as indicated in Figures 2 and 3 and is located mainly at the upper part of the disk. In a position radially inwardly of the contact strip 31 and on a line between the ears 27 and 28 is set in an accommodating opening in the disk a tubular brush holder 32 which is provided at one end with a binding post 33 and has telescoped in its opposite end the brush 34 which is outwardly spring-pressed by a spring 35. A binding post 36, provided with a tightening screw 37, traverses the disk 24 at the top thereof and forms connection with an intermediate part of the contact strip 31.

Outwardly spaced from the disk 24 is the rotatable disk which is fastened to the shaft 19 and this disk is generally designated 38 and which preferably consists of a circular dielectric body having a short extension 39 thereon which carries the set screw 40 by operation of which the disk 38 is locked to rotate with the shaft 19 once in every twenty-four hours.

Concentric with respect to the center of the disk 38 and on its back is the continuous circular contact strip 41 which has a radial extension 42 proceeding therefrom and including a tubular brush holder 43 in which is telescoped the brush 44 which is spring-pressed toward the disk 24 and into contact with the discontinuous strip 31 by the spring 45.

When the shaft 19 is rotated manually by means of the hand 20 to the proper position relative to the stationary disk 24 the brush 44 on the disk 38 will engage the arcuate discontinuous contact strip 31 with the brush 34 on the disk 24 engaging the continuous contact ring 41.

Figure 6:
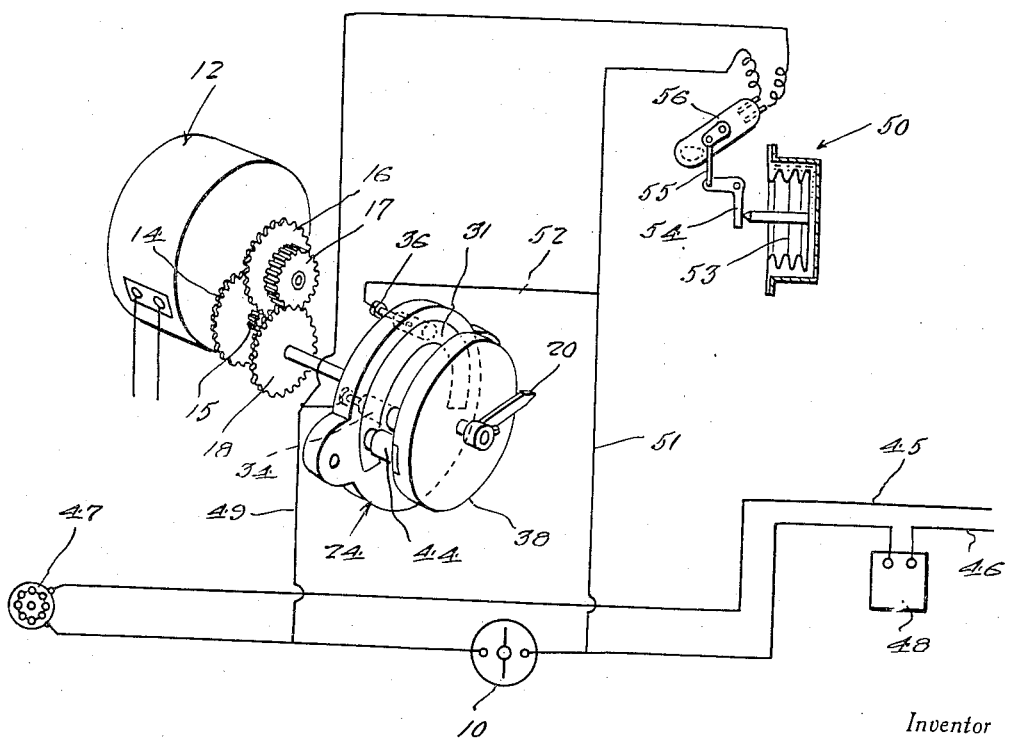
Figure 6 is a schematic diagram showing the mechanical and electrical association of the operative parts of the embodiment.

By reference to Figure 6 it will be apparent that the current supply wires 45 and 46 lead respectively to the input terminals of the refrigerator mechanism motor 47, the ordinary box thermostat 48 and the manual switch 10 being interposed in the supply line 46.

Between the switch 10 and the motor 47 the supply line 46 has a leader 49 which is connected with the brush 34 and also with one contact of the thermostatic switch which is generally designated 50. The thermostatic switch 50 will usually have a setting of 44 degrees F. and it has its opposite sides connected to the binding posts 33 and 36, respectively, and can operate only while the brush 44 is out of contact with the strip 31. Another leader 51 which leaves the supply line 46 between the box thermostat 48, which usually has a temperature setting of 36 degrees F., and the switch 10 is connected to the remaining terminal of the thermostatic switch 50 and has a jumper 52 which is connected with the binding post 36. The box thermostat 48 can only operate while the brush 44 is in contact with the discontinuous contact strip 31.

The rectangular box thermostat 48 is usually set for between 34° and 38° F. so that it will start and stop the motor 47 upon variation of the temperature within the refrigerating compartment beyond such established range. But the box thermostat is ineffective during the defrosting period when the current to the motor is cut off as in the usual practice, so that the temperature within the refrigerating compartment can rise above the said 34° to 38° range, as already pointed out herein. In accordance with the present invention the thermostat 50 is exposed to the temperature within the refrigerating compartment, and being set at a higher range of say from 39° to 40° F., is operative at the defrosting temperature; so that in view of the wiring connections described above, the auxiliary thermostat 50 will, upon the generation of a defrosting temperature above the arbitray 39° or 40° F., close the contacts leading to the wires 49 and 51 and thereby shunt the manual switch 10 as well as the time switch and start up the motor 47 so as to bring down the defrosting temperature in the refrigerating compartment to 39° or 40°, depending upon the setting of the thermostat 50, without, however, necessarily lowering the temperature to the refrigerating temperature arbitrarily set above at 34° or 38° F.; so that automatic provision is made for preventing the temperature within the refrigerating compartment from rising to a deleterious level during the defrosting operation. The brush 34 is always in contact with the continuous contact strip 41, and during such time as the brush 44 is engaged with the discontinuous contact strip 31 the circuit is closed and the thermostatic switches 48 and 50 can operate for control purposes, there being by this means a circuit established through them. However, this circuit is broken when the brush 44 leaves the contact strip 31.

It is to be recalled that the brush 34 of the disk 24 has continuous contact with the continuous contact circle 41 of the disk 38, and that the brush 44 of the disk 38 has contact with the arcuate discontinuous contact strip 31 of the disk 24 only during such time as the operation of the clock 12 maintains the disk 38 in the corresponding position relative to the disk 24, that is, during an ordinary refrigerating period. The brush 44 is out of engagement with the arcuate contact strip 31 during the defrosting period, due to the disk 38 and the indicator or clock hand 20 having turned relative to the disk 24 and to the indicia 21 on the front of the casing 5, at a regular rate, readable by means of the said indicia.

For convenience the auxiliary thermostat 50 may comprise a bellows arrangement 53 operating on one arm of a pivoted bell crank 54 which has an operative connection 55 with a mercury switch 56, such an arrangement being conventionally available.

The power conduits are led into the junction box 7 through a suitable fitting 57, and the conduits to the refrigerator mechanism motor are led out of the conduit box 6 through the fitting 58, conventional arrangements of this character being selectively available.

Although I have shown and described herein a preferred embodiment of my invention it is to be definitely understood that I do not desire to limit the application of the invention thereto, and any change or changes may be made in the materials and in the structure and arrangement of the parts, within the spirit of the invention and the scope of the subjoined claims.

What is claimed is:—

1. In a refrigerator, the combination of a refrigerating compartment, refrigerating means for said compartment, means for energizing said refrigerating means to maintain said refrigerating means at a temperature below freezing, time control means comprising a periodically operated switch for de-energizing said refrigerating means for a predetermined period to defrost said refrigerating means, and means comprising a thermostatic switch responsive to an increase in temperature within said compartment above that required for defrosting said refrigerating means to energize said refrigerating means independently of said periodically operated switch.

2. In a refrigerator, the combination of a refrigerating compartment, refrigerating means for said compartment, an electric motor for driving said refrigerating means including a supply circuit therefor, a time control switch included in said circuit for de-energizing said motor for a predetermined period to defrost said refrigerating means, and a thermostatic switch responsive to the temperature within said refrigerating compartment and being operable upon a rise in temperature above that required for de-frosting said refrigerating means to close the circuit of said motor independently of said time control switch.

3. In a refrigerator, the combination of a refrigerating compartment, refrigerating means for said compartment, means for energizing said refrigerating means including an electric supply circuit, a thermostatic switch located in said compartment and arranged to control said supply circuit to maintain a predetermined refrigerating temperature within said compartment, a time control switch connected in said circuit in series with said thermostatic switch and being operable to open said supply circuit for a predetermined period to defrost said refrigerating means, and an auxiliary thermostatic switch responsive to the temperature in said compartment and being operable upon a rise of temperature above that required for defrosting to close a path in said circuit in shunt to said time control switch.

4. The combination with a refrigerator having a refrigerating compartment, refrigerating mechanism, a source of current, a box thermostat interposed between said source and said mechanism for controlling the refrigerating temperature in said compartment during a refrigerating period, and a cut-off switch adapted to be closed during the refrigerating period and open during the defrosting period; of a time controlled switch and an auxiliary thermostatic switch, the latter being set to close only on a rise of temperature in said compartment above that required for defrosting, said time controlled switch and said auxiliary thermostatic switch being cooperatively electrically connected together and shunted across said cut-off switch.

5. A combination according to claim 2 wherein said time controlled switch comprises a clock, a shaft operatively connected to said clock, a rotary contact disk fixed on said shaft and having a continuous contact ring on one side, a stationary contact disk having a discontinuous arcuate contact on one side thereof, a first brush on said stationary disk continuously engaging said continuous contact ring, a second brush on said rotary disk and engaging said discontinuous arcuate contact.

6. A combination according to claim 2 wherein said time controlled switch comprises a clock, a shaft operatively connected to said clock, a rotary contact disk fixed on said shaft and having a continuous contact ring on one side, a stationary contact disk having a discontinuous arcuate contact on one side thereof, a first brush on said stationary disk continuously engaging said continuous contact ring, a second brush on said rotary disk and engaging said discontinuous arcuate contact, said disks and said continuous and discontinuous contacts being axially aligned and concentrically arranged with respect to the axis of said shaft.

RAY G. PHILLIPS.